(12) United States Patent
Lou

(10) Patent No.: US 12,705,751 B2
(45) Date of Patent: Aug. 11, 2026

(54) MAP SCENE RENDERING METHOD AND APPARATUS, SERVER, TERMINAL, COMPUTER-READABLE STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventor: Shuai Lou, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 157 days.

(21) Appl. No.: 18/629,175

(22) Filed: Apr. 8, 2024

(65) Prior Publication Data

US 2024/0259651 A1    Aug. 1, 2024

Related U.S. Application Data

(63) Continuation of application No. PCT/CN2023/094191, filed on May 15, 2023.

(30) Foreign Application Priority Data

Aug. 3, 2022 (CN) ......................... 202210928593.2

(51) Int. Cl.
*G06T 1/00* (2006.01)
*G06T 7/11* (2017.01)
*G06V 20/70* (2022.01)

(52) U.S. Cl.
CPC ................ *G06T 7/11* (2017.01); *G06V 20/70* (2022.01)

(58) Field of Classification Search
CPC ..... G06T 15/005; G06T 19/00; G06T 11/001; G06T 11/40; G06T 11/60; G06T 17/20;
(Continued)

(56) References Cited

U.S. PATENT DOCUMENTS

2020/0158529 A1* 5/2020 Zhang ................ G01C 21/3881
2022/0343597 A1* 10/2022 Moore ............. G08G 1/096827
2023/0394739 A1* 12/2023 Usher ................... G06T 15/503

FOREIGN PATENT DOCUMENTS

CN 111798364 A 10/2020
CN 114119818 A 3/2022
CN 114461742 A 5/2022

OTHER PUBLICATIONS

Extended European Search Report dated Mar. 4, 2025 in application No. 23848984.3.

(Continued)

*Primary Examiner* — Gordon G Liu
(74) *Attorney, Agent, or Firm* — Sughrue Mion, PLLC

(57) ABSTRACT

A map scene rendering method and apparatus including receiving a map rendering instruction transmitted by a terminal for a to-be-rendered map, the map rendering instruction comprising path start and end information in the to-be-rendered map, determining at least one target instance node corresponding to the path start and end information from a rendering instance node queue, the rendering instance node queue being obtained by associating M rendering instance nodes based on path information of the to-be-rendered map, rendering the resource tiles based on the at least one target instance node to obtain target video data, and transmitting the target video data to the terminal.

20 Claims, 9 Drawing Sheets

(58) Field of Classification Search
CPC ....... G06T 1/60; G06T 2210/52; G06T 11/00; G06T 2211/441; G06T 7/11; G06F 40/30; G06F 40/56; G06F 18/214; G06F 9/50; G06F 9/5027; G06N 3/084; Y02T 10/40; G06V 20/70; H04N 21/816; Y02D 10/00
USPC .......................................................... 345/418
See application file for complete search history.

(56) References Cited

OTHER PUBLICATIONS

Mallia et al. "Rendering of Free-viewpoint Video on the Cloud", IEEE Eurocon 2017, Jul. 6-8, 2017, Ohrid, R. Macedonia, pp. 9-14.
International Search Report for PCT/CN2023/094191, dated Jun. 15, 2023.
Written Opinion for PCT/CN2023/094191, dated Jun. 15, 2023.

* cited by examiner

MAP SCENE RENDERING METHOD AND APPARATUS, SERVER, TERMINAL, COMPUTER-READABLE STORAGE MEDIUM, AND COMPUTER PROGRAM PRODUCT

CROSS REFERENCE TO RELATED APPLICATIONS

This application is a continuation application of International Application No. PCT/CN2023/094191 filed on May 15, 2023, which claims priority to Chinese Patent Application No. 202210928593.2 filed with the China National Intellectual Property Administration on Aug. 3, 2022, the disclosures of each being incorporated by reference herein in their entireties.

FIELD

The disclosure relates to the field of Internet technologies, and specifically, to a map scene rendering method and apparatus, a server, a terminal, a computer-readable storage medium, and a computer program product.

BACKGROUND

In recent years, with the rapid development of Internet technologies, map products have been widely used in scenarios such as map navigation, smart cultural tourism, and smart transportation. In the related art, cloud rendering is mostly used for rendering a video of a map scene, and a rendered video is transmitted to a terminal to display the corresponding map scene in the terminal.

In the related art, it is learned that when the same map scene is viewed on a plurality of terminals distributed on the same computing node, a cloud needs to perform a plurality of cloud renderings on the same map scene separately, increasing resource occupation and affecting efficiency of map scene rendering.

SUMMARY

Some embodiments provide a map scene rendering method and apparatus, a server, a terminal, a computer-readable storage medium, and a computer program product, to reduce a cloud resource occupation ratio, thereby improving rendering efficiency of a map scene.

Some embodiments provide a map scene rendering method, performed by an electronic device. The method includes: receiving a map rendering instruction transmitted by a terminal for a to-be-rendered map, the map rendering instruction comprising path start and end information in the to-be-rendered map; determining at least one target instance node corresponding to the path start and end information from a rendering instance node queue, the rendering instance node queue being obtained by associating M rendering instance nodes based on path information of the to-be-rendered map, the M rendering instance nodes being for rendering N resource tiles, the N resource tiles being obtained by dividing a map scene resource based on scene structure information of the to-be-rendered map, the map scene resource being for rendering a map scene of the to-be-rendered map, M and N being positive integers and M being less than or equal to N; rendering the resource tiles based on the at least one target instance node to obtain target video data; and transmitting the target video data to the terminal.

Some embodiments provide a first map scene rendering apparatus, including: at least one memory configured to store program code, and at least one processor configured to read the program code and operate as instructed by the program code, the program code comprising: receiving code configured to cause at least one of the at least one processor to receive a map rendering instruction transmitted by a terminal for a to-be-rendered map, the map rendering instruction comprising path start and end information in the to-be-rendered map; rendering code configured to cause at least one of the at least one processor to: determine at least one target instance node corresponding to the path start and end information from a rendering instance node queue, the rendering instance node queue being obtained by associating M rendering instance nodes based on path information of the to-be-rendered map, the M rendering instance nodes being for rendering N resource tiles, the N resource tiles being obtained by dividing a map scene resource based on scene structure information of the to-be-rendered map, the map scene resource being for rendering a map scene of the to-be-rendered map, M and N being positive integers and M being less than or equal to N, and render the resource tiles based on the at least one target instance node to obtain target video data; and video transmitting code configured to transmit the target video data to the terminal.

Some embodiments provide a non-transitory computer-readable storage medium storing computer code which, when executed by at least one processor, causes the at least one processor to at least: receive a map rendering instruction transmitted by a terminal for a to-be-rendered map, the map rendering instruction comprising path start and end information in the to-be-rendered map determine at least one target instance node corresponding to the path start and end information from a rendering instance node queue, the rendering instance node queue being obtained by associating M rendering instance nodes based on path information of the to-be-rendered map, the M rendering instance nodes being for rendering N resource tiles, the N resource tiles being obtained by dividing a map scene resource based on scene structure information of the to-be-rendered map, the map scene resource being for rendering a map scene of the to-be-rendered map, M and N being positive integers and M being less than or equal to N; render the resource tiles based on the at least one target instance node to obtain target video data; and transmit the target video data to the terminal.

In some embodiments, a map scene resource is divided based on scene structure information of a to-be-rendered map, and a rendering instance node queue corresponding to resource tiles is constructed based on path information of the to-be-rendered map. Therefore, when a map rendering instruction for the to-be-rendered map is received, based on path start and end information carried in the map rendering instruction, a corresponding target instance node is found in the rendering instance node queue, and the resource tiles corresponding to the path start and end information are rendered based on the target instance node. In this way, a process of rendering a map based on at least one target instance node is implemented, and rendering granularity is refined. Therefore, repeated rendering on the map scene resource can be avoided, to reduce a cloud resource occupation ratio and improve resource utilization. In addition, the tiling-based resource rendering method can improve rendering concurrency, thereby improving rendering efficiency of a map scene.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
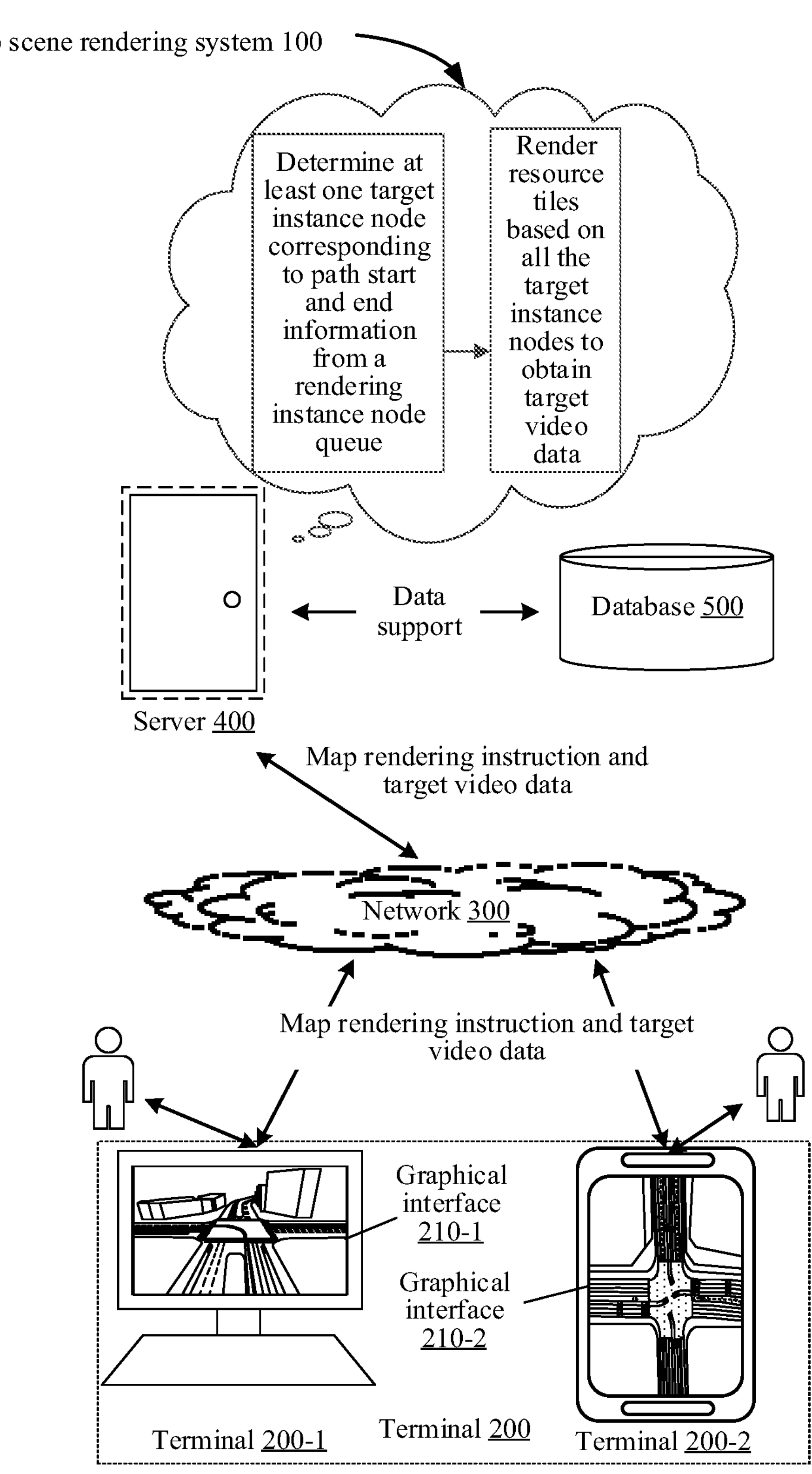
FIG. 1 is a schematic diagram of an implementation scenario of a map scene rendering method according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

For a cloud-rendered map product rendered undergone cloud rendering where a rendered video stream is transmitted to a terminal for display, a rendering effect and a visualization effect can be improved. In a related map scene rendering method, a complete map scene resource of a map rendering program is rendered by a rendering instance node. There is a specific similarity in operations of terminal sides on cloud-rendered maps. Similar to a game scenario, there is a specific probability of repeatability in start and end paths of rendering instance execution. When the same map scene is viewed on a plurality of terminals distributed on the same computing node, a cloud needs to perform a plurality of cloud renderings on the same map scene separately, increasing resource consumption of a cloud rendering instance running on the cloud. This increases concurrent cloud resource occupation, affects efficiency of map scene rendering, and limits interactivity and customization diversity of the cloud-rendered map product.

Based on this, some embodiments provide a map scene rendering method and apparatus, a server, a terminal, a computer-readable storage medium, and a computer program product, to reduce a cloud resource occupation ratio, thereby improving rendering efficiency of a map scene. A first map scene rendering apparatus may be integrated in an electronic device such as a terminal. A second map scene rendering apparatus may be integrated in an electronic device such as a server.

The server may be an independent physical server, or a server cluster or a distributed system including a plurality of physical servers, or may be a cloud server that provides a basic cloud computing service such as a cloud service, a cloud database, cloud computing, a cloud function, cloud storage, a network service, a cloud communication, a middleware service, a domain name service, a security service, a network acceleration service (content delivery network (CDN)), or a big data and artificial intelligence platform. The terminal may include but is not limited to a mobile phone, a computer, an intelligent voice interaction device, a smart home appliance, an on-board terminal, an aerial vehicle, and the like. The terminal and the server may be connected directly or indirectly via a wired or a wireless communication method. This is not limited herein.

FIG. 1 is a schematic diagram of an implementation scenario of a map scene rendering method according to some embodiments. In a map scene rendering system 100, a terminal 200 (a terminal 200-1 and a terminal 200-2 are shown as examples) is connected to a server 400 via a network 300. The network 300 may be a wide area network or a local area network, or a combination thereof. In addition, the map scene rendering system 100 further includes a database 500 for providing data support to the server 400. Moreover, what is shown in FIG. 1 is a situation in which the database 500 is independent of the server 400. In addition, the database 500 may be integrated in the server 400. This is not limited herein.

The terminal 200 is configured to generate, in response to a map display operation on a to-be-rendered map, a map rendering instruction, and transmit the map rendering instruction to the server 400 via the network 300, the map rendering instruction including path start and end information in the to-be-rendered map; receive target video data returned by the server 400 via the network 300 for the map rendering instruction, the target video data being data obtained by determining at least one target instance node from a rendering instance node queue based on the path start and end information and rendering corresponding resource tiles based on all the target instance nodes by the server, the rendering instance node queue being obtained by associating M rendering instance nodes based on path information of the to-be-rendered map, the M rendering instance nodes being used for rendering N resource tiles, the N resource tiles being obtained by dividing a map scene resource based on scene structure information of the to-be-rendered map, the map scene resource being used for rendering the map scene of the to-be-rendered map, M≤N, and M and N being positive integers; and display a map scene clip based on the target video data (a graphical interface 210-1 and a graphical interface 210-2 are shown as examples).

The server 400 is configured to receive the map rendering instruction transmitted by the terminal 200 via the network 300 for the to-be-rendered map, the map rendering instruction including the path start and end information in the to-be-rendered map; determine the at least one target instance node corresponding to the path start and end information from the rendering instance node queue; render the resource tiles based on all the target instance nodes to obtain the target video data; and transmit the target video data to the terminal 200 via the network 300.

Some embodiments can be applied to various scenarios, including but not limited to a cloud technology, artificial intelligence, smart transportation, driver assistance, and the like. The schematic diagram of the implementation environment scene of the map scene rendering method shown in FIG. 1 is merely an example. The implementation environment scene of the map scene rendering method described herein is to describe the technical solutions of some embodiments more clearly, and does not constitute a limitation on the technical solutions provided in some embodiments. A person of ordinary skill in the art may learn that the technical solutions provided in some embodiments are also applicable to a similar technical problem as the map scene rendering evolves and a new service scenario emerges.

The map scene rendering provided in some embodiments is applied to a cloud-rendered map product. For example, the cloud-rendered map product may include a map product used in a digital twin scenario such as map navigation, smart cultural tourism, smart transportation, and a scenic area.

Some embodiments describe the map scene rendering method provided in some embodiments from a perspective of the server and the terminal.

Figures 2A, 2B:
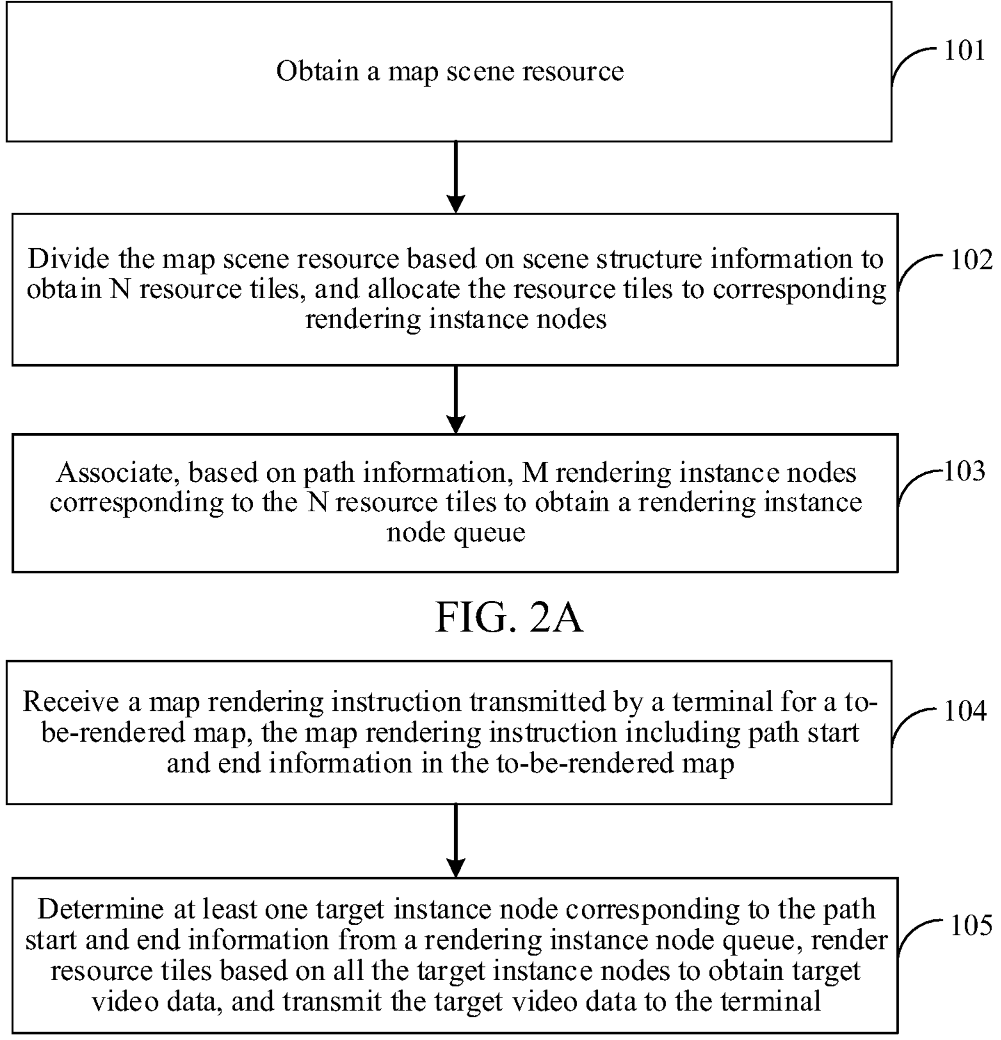
FIG. 2A is a schematic flowchart of obtaining a target instance node according to some embodiments.
FIG. 2B is a schematic flowchart of a map scene rendering method according to some embodiments.

FIG. 2A is a schematic flowchart of obtaining a target instance node according to some embodiments. An execution subject of a process of obtaining the target instance node is a server. The process of obtaining the target instance node includes operations 101 to 103. Each operation is described separately below.

Operation 101: Obtain a map scene resource.

The map scene resource may be used for constructing a map scene of a to-be-rendered map, and the map scene may be a map picture displayed in a virtual scene. In some embodiments, the map scene may be a virtual map scene displayed in a three-dimensional animation form.

Operation 102: Divide the map scene resource based on scene structure information to obtain N resource tiles, and allocate the resource tiles to corresponding rendering instance nodes.

The scene structure information may be information describing structure distribution of the to-be-rendered map, for example, may include scenario distribution information of the to-be-rendered map, and may also include information such as object distribution information in the map scene. The scenario distribution information may include information describing hierarchical distribution of scenarios in the map scene, for example, may include information such as scenarios of the to-be-rendered map and division of each scenario in the map scene, or hierarchical structures of floors in the map scene. The scenarios may represent a process in the map scene or a regional division result of the to-be-rendered map. For example, the scenarios may represent a floor division result, a seasonal division result, a territory division result, or another type of regional division result in the map scene. For example, in a to-be-rendered map of a digital twin scene type corresponding to a scenic area, the scenarios may represent floor levels or region types in a map scene, for example, the first floor, the second floor, and another floor level, or a leisure region, a sightseeing region, a dining region, and another region type. The scenarios may further represent task levels or virtual scenario levels in the map scene. For example, the scenarios may represent map modules, task levels, or game levels in a game-type map scene. The object distribution information may represent distribution of map element objects of the to-be-rendered map in the map scene. The map element objects may be element objects that constitute the map scene, or may be element objects distributed in the map scene. The element objects may be visual elements such as virtual tables, virtual doors, virtual chairs, virtual cups, virtual plants, and virtual ponds in the map scene. The resource tiles may be tiles obtained by dividing the map scene resource. The rendering instance node may be an instance node for rendering the resource tiles. The instance node may be an instance deployed in a cloud.

There may be a plurality of methods to divide the map scene resource based on the scene structure information of the to-be-rendered map. For example, when the scene structure information includes the scenario distribution information, the map scene resource may be divided in a scenario dimension based on the scenario distribution information corresponding to the to-be-rendered map, to obtain scenario resource tiles corresponding to each scenario of the to-be-rendered map. Adjacent scenarios in the scenario are identified based on the scenario distribution information, and a cross-scenario resource tile of the adjacent scenarios are obtained by dividing the map scene resource. A plurality of resource tiles corresponding to the map scene are determined based on the scenario resource tiles and the cross-scenario resource tile.

The scenario distribution information may include distribution information of each scenario of the to-be-rendered map in the map scene. The scenario resource tiles may be tiles of a map scene resource corresponding to each scenario. The adjacent scenarios may be scenarios that have an adjacent relationship in the map scene. The cross-scenario resource tile may be a resource tile between the adjacent scenarios in the map scene resource.

There may be a plurality of methods to obtain the scenario distribution information. For example, the map scene resource may be traversed to obtain, based on a traversed result, the scenario distribution information corresponding to the to-be-rendered map, or the scenario distribution information corresponding to the to-be-rendered map may be pre-configured before the map scene is rendered. This is not limited herein.

There may be a plurality of methods to divide the map scene resource in the scenario dimension based on the scenario distribution information corresponding to the to-be-rendered map. For example, the map scene resource may be divided into scenarios based on the scenario distribution information, to obtain a scenario resource clip corresponding to each scenario. Point of interest identification is performed on the scenario resource clip to obtain point of interest distribution corresponding to each scenario. The scenario resource clip is divided based on the point of interest distribution, to obtain scenario resource tiles corresponding to each scenario.

The scenario resource clip may be a map resource clip that is corresponding to each scenario and that is obtained by dividing the map scene resource based on each scenario. The point of interest distribution may be distribution of points of interest of each scenario in the map scene. A point of interest (POI) may be a map element object in the map scene, for example, may be a virtual house, a virtual shop, a virtual mailbox, a virtual bus stop, a virtual chair, a virtual tree, or another element in the map scene. In some embodiments, granularity of points of interest may be adjusted according to actual service requirements. For example, during map navigation, the point of interest may be an element at granularity of a virtual house, a virtual shop, a virtual mailbox, or the like. The indoor point of interest may be an element at granularity of a virtual table, a virtual cup, a virtual chair, or the like.

There may be a plurality of methods to perform point of interest identification on the scenario resource clip. For example, each map element object in the scenario resource clip may be identified. In this case, an emphasis program and identification granularity of each map element object may be determined according to actual service requirements. Therefore, a matching point of interest can be identified in the scenario resource clip based on the emphasis program and the identification granularity of each map element object.

In some embodiments, after the point of interest identification is performed on the scenario resource clip, the scenario resource clip can be divided based on the point of interest distribution. There may be a plurality of methods to divide the scenario resource clip based on the point of interest distribution. For example, path distribution of each point of interest may be identified in a corresponding scenario resource clip based on the point of interest distribution. Each point of interest is used as a dividing node Dividing nodes are divided based on the path distribution to obtain a plurality of scenario resource tiles. In other words, a resource corresponding to a path between any two reachable points of interest is a resource tile.

In some embodiments, after the map scene resource is divided in the scenario dimension based on the scenario distribution information corresponding to the map scene, the adjacent scenarios in the scenario can be identified based on the scenario distribution information. There may be a plurality of methods to identify the adjacent scenarios among all scenarios of the to-be-rendered map based on the scenario distribution information. For example, a topological sorting sequence of each scenario in the to-be-rendered map may be determined based on scenario announcement information. The adjacent scenarios having an adjacent relationship among all the scenarios of the to-be-rendered map may be identified according to the topological sorting sequence of the scenario.

In some embodiments, after the adjacent scenarios are identified among all the scenarios of the to-be-rendered map based on the scenario distribution information, the map scene resource is divided to obtain the cross-scenario resource tile of the adjacent scenarios. There may be a plurality of methods to divide the map scene resource to obtain the cross-scenario resource tile of the adjacent scenarios. For example, connection distances of candidate scenario connection paths of the adjacent scenarios are calculated based on the scenario resource tiles corresponding to each scenario. A target connection path is selected from the candidate scenario connection paths based on the connection distances. Based on the target connection path, the cross-scenario resource tile of the adjacent scenarios is obtained by dividing the map scene resource.

A candidate scenario connection path may be a path between the adjacent scenarios for connecting two scenarios having an adjacent relationship. Through the path, entering from any scenario among the adjacent scenarios to the other scenario among the adjacent scenarios can be achieved. The connection distances may be distances corresponding to the candidate scenario connection paths, and the target connection path may be an optimal path selected from the candidate scenario connection paths based on the connection distances. The optimal path may be at least one of the following: the shortest path, the path chosen most frequently, the path that takes the shortest time, or the flattest path.

There may be a plurality of methods to calculate the connection distances of the candidate scenario connection paths of the adjacent scenarios based on the scenario resource tiles corresponding to each scenario. For example, a reference point may be selected in a scenario resource tile, so that a distance between two scenarios among the adjacent scenarios in the map scene can be calculated based on the reference point in each scenario resource tile, to obtain the connection distances of the candidate scenario connection paths.

In some embodiments, after the connection distances of the candidate scenario connection paths between the adjacent scenarios are calculated based on the scenario resource tiles corresponding to each scenario, the target connection path can be selected from the candidate scenario connection paths based on the connection distances. There may be a plurality of methods to select the target connection path from the candidate scenario connection paths based on the connection distances. For example, a candidate scenario connection path having the shortest connection distance is used as the target connection path according to a shortest path algorithm.

In some embodiments, after the cross-scenario resource tile of the adjacent scenarios is obtained by dividing the map scene resource, the plurality of resource tiles can be determined based on the scenario resource tiles and the cross-scenario resource tile. There may be a plurality of methods to determine the plurality of resource tiles based on the scenario resource tiles and the cross-scenario resource tile. For example, the scenario resource tiles and the cross-scenario resource tile may be directly used as the plurality of resource tiles obtained by dividing the map scene resource. In some embodiments, an indirect method may be used to determine the plurality of resource tiles based on the scenario resource tiles and the cross-scenario resource tile. This is not limited herein.

In some embodiments, after the map scene resource is divided based on the scene structure information of the to-be-rendered map, the resource tiles are allocated to corresponding rendering instance nodes. There may be a plurality of methods to allocate the resource tiles to the corresponding rendering instance nodes. For example, at least one resource tile corresponding to each scenario may be allocated to the same rendering instance node. In other words, one rendering instance node is used for rendering at least one resource tile corresponding to one scenario. In some embodiments, one resource tile may be allocated to one rendering instance node. In other words, one rendering instance node is used for rendering one resource tile. In some embodiments, a plurality of resource tiles may be allocated to the same rendering instance node. In other words, one rendering instance node is used for rendering a plurality of resource tiles. A correspondence between the resource tile and the rendering instance node may be set according to actual conditions. This is not limited herein.

It is to be understood that, a map scene resource is divided based on scene structure information of a to-be-rendered map, and each resource tile is associated with a rendering instance node. When a map rendering request is received, rendering may be performed on a corresponding resource tile based on the rendering instance node, to implement fine-grained tiling-based rendering on the to-be-rendered map in the form of resource tile, improving rendering flexibility and avoiding repeated rendering on resources. In addition, this can reduce cloud resource occupation, thereby improving rendering efficiency of a map scene.

Operation 103: Associate, based on path information, M rendering instance nodes corresponding to the N resource tiles to obtain a rendering instance node queue.

The path information may represent distribution information of paths in the map scene and may describe distribution of all road channels in the map scene. The rendering instance node queue may be a queue established by sorting the rendering instance nodes based on the path information.

There may be a plurality of methods to associate the M rendering instance nodes based on the path information of the to-be-rendered map, to obtain the rendering instance node queue corresponding to the map scene resource. For example, connection path distribution of the resource tiles in the map scene may be identified based on the path information corresponding to the map scene. A node connection sequence between the M rendering instance nodes is determined based on the connection path distribution. The rendering instance node queue corresponding to the map scene resource is constructed according to the node connection sequence.

The connection path distribution may be distribution of connection paths in the map scene, and the connection paths are paths corresponding to the resource tiles. For example, each resource tile may be used as a node, so that the connection path distribution of the resource tiles in the map scene can be identified based on distribution of scenes corresponding to the resource tiles in the map scene described in the path information. The node connection sequence may be determined based on the distribution of the scenes corresponding to the resource tiles in the map scene.

It is to be understood that, a mapping relationship between a rendering instance node and a resource tile in a map scene is constructed via a rendering instance node queue, so that fine-grained tiling-based rendering on a map scene resource can be implemented by controlling a cloud based on the rendering instance node in the rendering instance node queue. This avoids repeated rendering on the resource and reduces cloud resource occupation, thereby improving rendering efficiency of the map scene.

There may be a plurality of methods to determine the node connection sequence between the M rendering instance nodes based on the connection path distribution. For example, a node relationship graph corresponding to the M rendering instance nodes is constructed based on the connection path distribution of the resource tiles. The node connection sequence between the M rendering instance nodes is identified based on the node relationship graph.

The node relationship graph may be a directed acyclic graph (DAG) constructed based on the rendering instance nodes. The directed acyclic graph is a directed graph without loops.

There may be a plurality of methods to construct, based on the connection path distribution of the N resource tiles, the node relationship graph corresponding to the rendering instance nodes. For example, the N resource tiles may include the scenario resource tiles and the cross-scenario resource tile, so that a node relationship subgraph corresponding to each scenario can be constructed based on the scenario resource tiles among the N resource tiles and the connection path distribution. Based on the cross-scenario resource tile among the resource tiles, node relationship subgraphs are spliced to obtain the node relationship graph corresponding to the rendering instance nodes.

When the node relationship subgraph corresponding to each scenario is constructed, any path corresponding to the scenario is determined as an edge of the node relationship subgraph, and a start point of the path is determined as a node of the node relationship subgraph.

The node relationship subgraph may be a directed acyclic graph constructed based on rendering instance nodes corresponding to each scenario. For example, assuming that there are four scenarios in the map scene, there may be four corresponding node relationship subgraphs in the map scene.

Figure 3A:
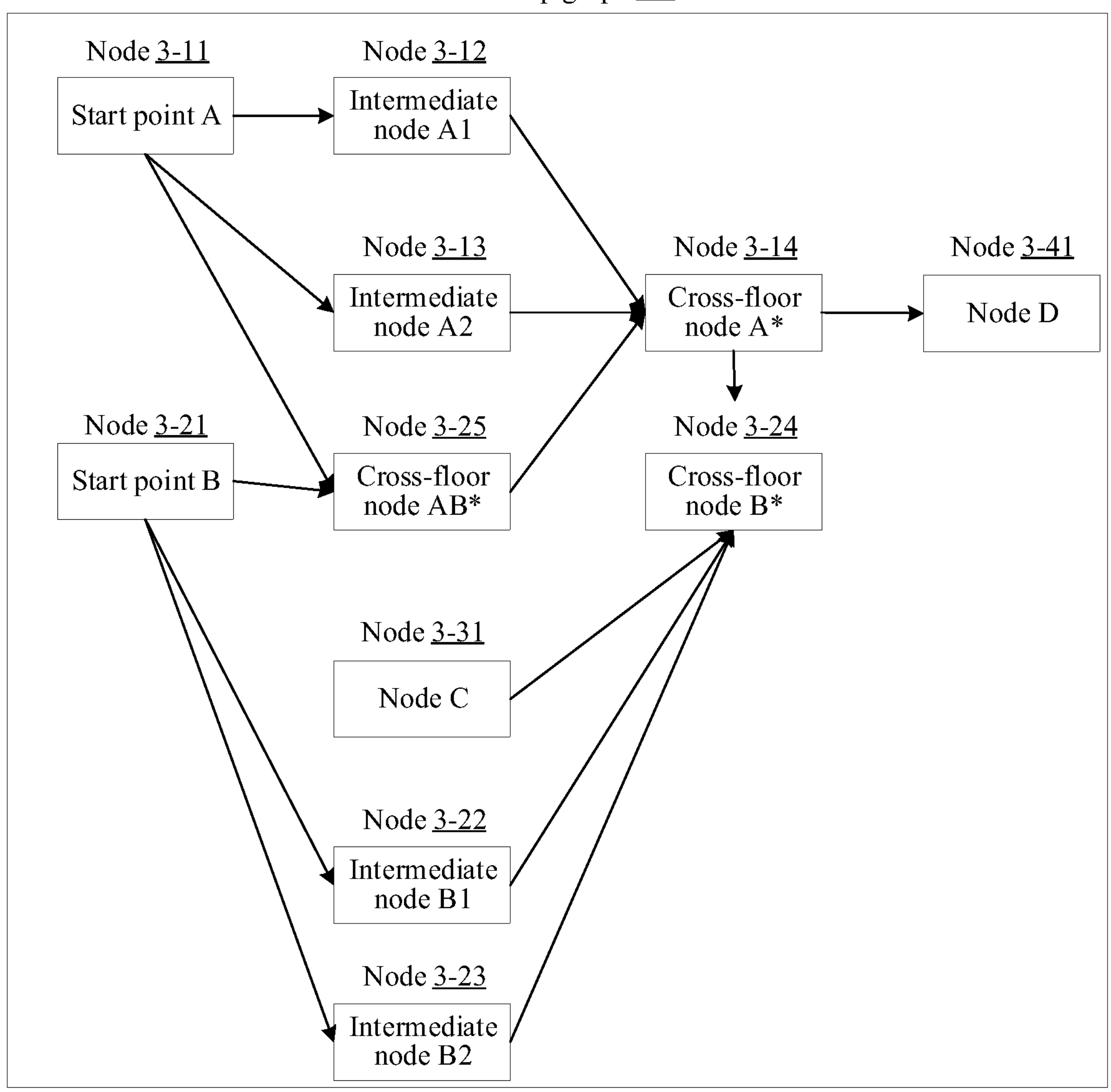
FIG. 3A is a schematic diagram of a topological structure of a map scene rendering method according to some embodiments.

There may be a plurality of methods to construct, based on the scenario resource tiles among the resource tiles and the connection path distribution, the node relationship subgraph corresponding to each scenario. For example, FIG. 3A is a schematic diagram of a topological structure of a map scene rendering method according to some embodiments. As shown in FIG. 3A, a map scene corresponding to a node relationship graph 3-1 includes four scenarios a, b, c, and d. A node relationship subgraph corresponding to each scenario may be constructed based on scenario resource tiles and connection path distribution of each scenario. A node relationship subgraph (subtopology structure A) corresponding to scenario a may include node 3-11 (which is referred to as start point A (POI A)), node 3-12 (which is referred to as intermediate node A1 (POI A1)), node 3-13 (which is referred to as intermediate node A2 (POI A2)), and node 3-14 (which is referred to as a cross-scenario key node (cross-floor node A*)). Scenario a includes paths from start point A to cross-floor node A*, where intermediate node A1 and intermediate node A2 are passed. Therefore, a map scene corresponding to scenario a can be divided into five resource tiles, A-A1, A-A2, A1-A2, A1-A*, and A2-A*. A node relationship subgraph (subtopology structure B) corresponding to scenario b may include node 3-21 (which is referred to as start point B (POI B)), node 3-22 (which is referred to as intermediate node B1 (POI B1)), node 3-23 (which is referred to as intermediate node B2 (POI B2)), node 3-24 (which is referred to as a cross-scenario key node (cross-floor node B*)), and node 3-25 (which is referred to as a cross-scenario key node (cross-floor node AB*)) corresponding to scenario a. Further, a node relationship subgraph (subtopology structure C) corresponding to scenario c includes node 3-31 (which is referred to as node C (POI C)). In addition, a node relationship subgraph (subtopology structure D) corresponding to scenario d includes node 3-41 (referred to as node D (POI D)). The cross-scenario key node may be a node connecting the two scenarios among the adjacent scenarios, may be a rendering instance node corresponding to the cross-scenario resource tile, and may be used for splicing the node relationship subgraphs. Therefore, a node relationship graph corresponding to an entire map scene can be divided into a plurality of subdivided node relationship subgraphs. The node relationship subgraphs are associated based on a cross-scenario key node. Therefore, a node connection sequence of rendering instance nodes can be obtained based on distribution of resource tiles in the map scene, and then a rendering instance node queue corresponding to the map scene resource can be constructed according to the node connection sequence. In this way, tiling-based rendering on the map scene resource can be implemented based on the rendering instance node queue, to improve rendering efficiency of the map scene and reduce resource occupation.

FIG. 2B is a schematic flowchart of a map scene rendering method according to some embodiments. An execution subject of a process of obtaining a target instance node is a server. The process of obtaining the target instance node includes operation 104 and operation 105. Each operation is described separately below.

Operation 104: Receive a map rendering instruction transmitted by a terminal for a to-be-rendered map, the map rendering instruction including path start and end information in the to-be-rendered map.

The map rendering instruction may be an instruction for rendering the to-be-rendered map. The map rendering instruction may include the path start and end information in the to-be-rendered map. The path start and end information may include start and end locations of a to-be-rendered map scene clip indicated by the map rendering instruction in a corresponding map scene. Therefore, a location range of the to-be-rendered map scene clip in the corresponding map scene can be determined based on the path start and end information, and further to-be-rendered resource tiles can be determined.

For example, a user's click/tap, move, and another operation in a client corresponding to the map scene are received to obtain a map operation instruction. The map operation instruction indicates a path change from location e to location f. Therefore, the map operation instruction can trigger the terminal to generate a map rendering instruction instructing to render a map scene clip from location e to location f. The map scene clip may include at least one resource tile.

Operation 105: Determine at least one target instance node corresponding to the path start and end information from a rendering instance node queue, render the resource tiles based on all the target instance nodes to obtain target video data, and transmit the target video data to the terminal.

The target instance node may be a rendering instance node corresponding to the to-be-rendered resource tiles determined based on the map rendering instruction.

There may be a plurality of methods to determine the target instance node in the rendering instance node queue based on the path start and end information. For example, a start location and an end location in the to-be-rendered map may be extracted from the path start and end information, and a target location interval between the start location and the end location may be obtained. At least one target resource tile located in the target location interval is identified from N resource tiles, to select the target instance node from the rendering instance node queue based on the target resource tile.

The start location may be a corresponding start location of the to-be-rendered map scene clip in the map scene, for example, may be the first resource tile in the to-be-rendered map scene clip. The end location may be a corresponding end location of the to-be-rendered map scene clip in the map scene, for example, may be the last resource tile in the to-be-rendered map scene clip. The target location interval may be an interval between the start location and the end location, that is, a corresponding location interval of the to-be-rendered map scene clip in the map scene. The target resource tile may be a resource tile corresponding to the to-be-rendered map scene clip, that is, the to-be-rendered resource tile.

After the target instance node is determined from the rendering instance node queue based on the path start and end information, the resource tile can be rendered based on the target instance node. There may be a plurality of methods to render the resource tile based on the target instance node. For example, the instruction may be distributed based on a topological structure corresponding to a node relationship graph. To be specific, addresses of the rendering instance nodes corresponding to all the resource tiles in a path from the start location to the end location in the map scene may be obtained via a gateway node. Then, based on the addresses, the map rendering instruction may be split and then delivered to the corresponding rendering instance nodes (which are referred to as the target instance nodes), so that the corresponding resource tiles (which are referred to as the target resource tiles) can be rendered based on the target instance nodes. For example, based on each target instance node, map rendering on the target instance node's own region is performed in a cloud map three-dimensional (3D) engine to generate rendering frames drawn based on continuous base map elements, so that rendered video data corresponding to the map scene can be obtained based on the rendering frames.

In some embodiments, after the resource tiles are rendered based on the target instance nodes, a topological sorting parameter of the rendered video data may further be obtained. The rendered video data is labeled based on the topological sorting parameter, to obtain the target video data and transmit the target video data to the terminal.

The rendered video data may be data obtained by rendering, based on a target instance node, the resource tiles corresponding to the map scene. The topological sorting parameter may be distribution information of the rendered video data in the map scene determined based on the node relationship graph corresponding to the map scene. For example, the topological sorting parameter may include information such as scenarios and rendering instance nodes corresponding to the rendered video data, and distribution of the rendering instance nodes corresponding to the rendered video data in the node relationship graph. The target video data may be data obtained by labeling at least one piece of rendered video data based on at least one topological sorting parameter.

There may be a plurality of methods to label the rendered video data based on the topological sorting parameter. For example, Table 1 is a packet header structure of a map scene rendering method according to some embodiments. Information such as a topological sorting linked list corresponding to the rendered video data, a current rendering instance node, camera parameters of the first and last frames corresponding to a current rendering instance, and a pixel stream size, a pixel length and width, and pixel stream content corresponding to the rendered video data can be obtained. Based on the information, a packet header corresponding to the rendered video data is labeled. The topological sorting linked list may be a linked list determined based on the node relationship graph corresponding to the map scene. The pixel stream may be a pixel stream corresponding to the rendered video data. The current rendering instance node may be a rendering instance node corresponding to the rendered video data. The map camera parameters may be map camera parameters of the first and last key frames corresponding to the current rendering instance node, such as center point coordinates, a map level, and a rotated lodging angle. Based on the parameters, fusion of the first and last frames of the rendered video data across the rendering instance node can be implemented.

TABLE 1

| Packet header | Topological sorting linked list | Current rendering instance node | Camera parameters of the first and last frames corre-sponding to a current rendering instance | Pixel stream size | Pixel length and width | Pixel stream content |
|---|---|---|---|---|---|---|

Figure 3B:
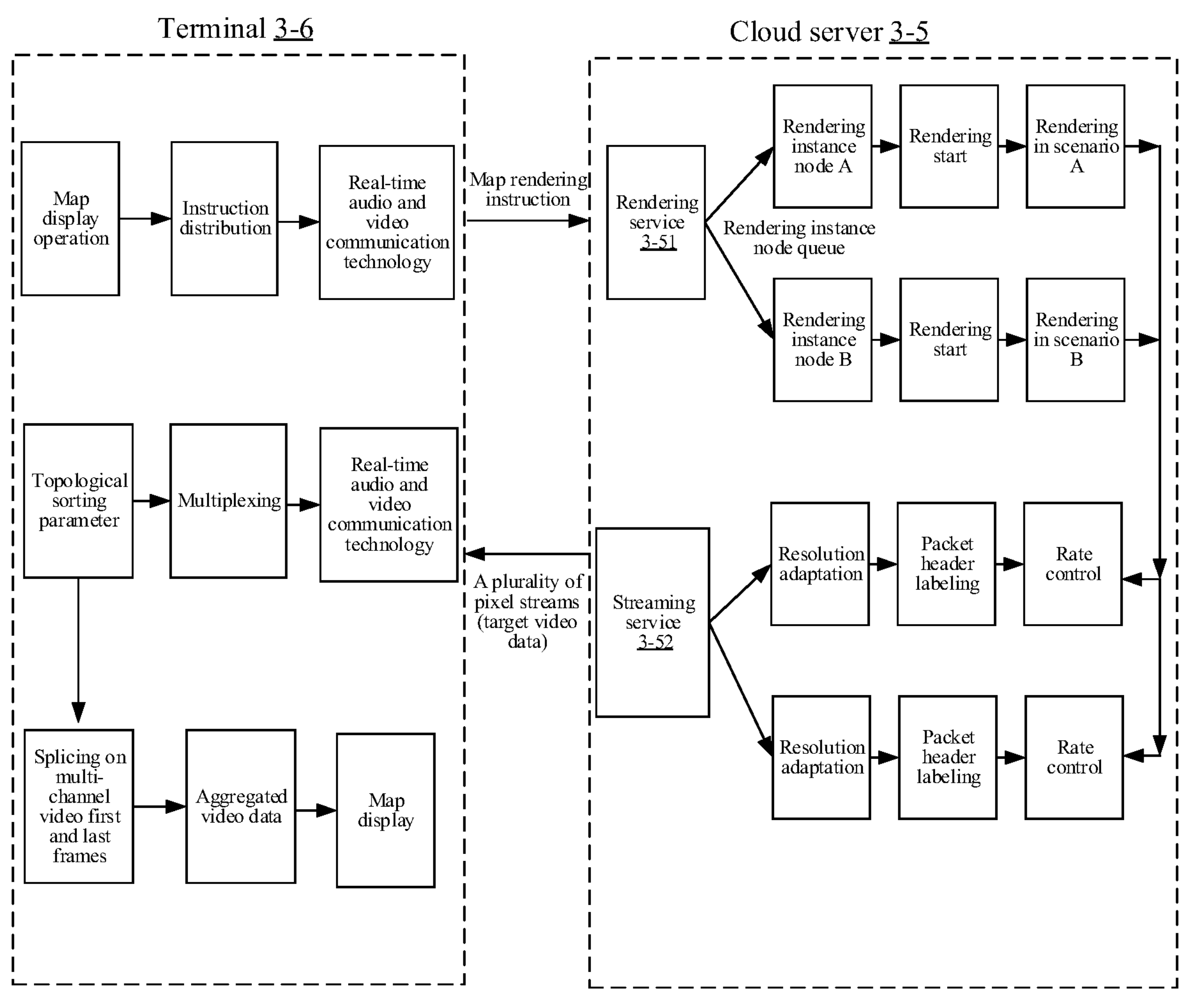
FIG. 3B is a schematic flowchart of a map scene rendering method according to some embodiments.

FIG. 3B is a schematic flowchart of a map scene rendering method according to some embodiments. In a cloud server 3-5, when a rendering service 3-51 obtains at least one target instance node from a rendering instance node queue in response to a map rendering instruction, and the at least one target instance node is rendering instance node A and rendering instance node B, an instruction is distributed. Therefore, rendering is started for rendering instance node A and rendering instance node B respectively, so that a corresponding resource tile is rendered in scenario A, and a corresponding resource tile is rendered in scenario B. After the rendering operations for rendering instance node A and rendering instance node B are started, a streaming service 3-52 can also perform rate control on rendered video data obtained by rendering, and can also perform packet header labeling on a key frame generated during the rendering, and add information such as a topological sorting parameter corresponding to the rendered video data during labeling. In addition, the rendered video data can be adapted to different granularity based on display effects of different terminals, thereby reducing a size of a transmission data stream and reducing time for decoding on the terminal. Configuration parameters (such as widths and heights, pixel density, and sampling granularity) on the terminal may be adapted to corresponding resolutions by using an instance. In this way, a plurality of generated pixel streams (which are referred to as target video data) can be transmitted to a terminal 3-6 by the streaming service, so that a corresponding map scene can be displayed in the terminal 3-6.

In some embodiments, because each rendering instance node in the rendering instance node queue has a topological sorting sequence determined based on a node relationship graph, the terminal plays each piece of rendered video data corresponding to each rendering instance node according to the topological sorting sequence. Therefore, a scheduling sequence of rendering instance nodes can be maintained in a cloud to coordinate a sequence in which the rendered video data corresponding to each rendering instance node is transmitted to the terminal. For example, a playback sequence can be determined according to the scheduling sequence. The rendered video data corresponding to the rendering instance node can be grouped based on the playback sequence, and the rendered video data can be transmitted to the terminal in groups. This can reduce resource consumption of terminal reordering, thereby reducing a playback delay of the map scene on the terminal caused by reverse reordering, and improving playback efficiency.

It can be learned from the above that, in some embodiments, a map scene resource is divided based on scene structure information of a map scene, and a rendering instance node queue corresponding to resource tiles is constructed based on path distribution of the map scene. Therefore, when a map rendering instruction for the map scene is received, based on path start and end information carried in the map rendering instruction, a target instance node corresponding to the map scene is found in the rendering instance node queue, and the resource tiles corresponding to the path start and end information are rendered based on the target instance node. This avoids repeated rendering on the map scene resource and reduces a cloud resource occupation ratio. In addition, the tiling-based resource rendering method improves rendering efficiency of the map scene, thereby improving resource utilization.

Figure 4:
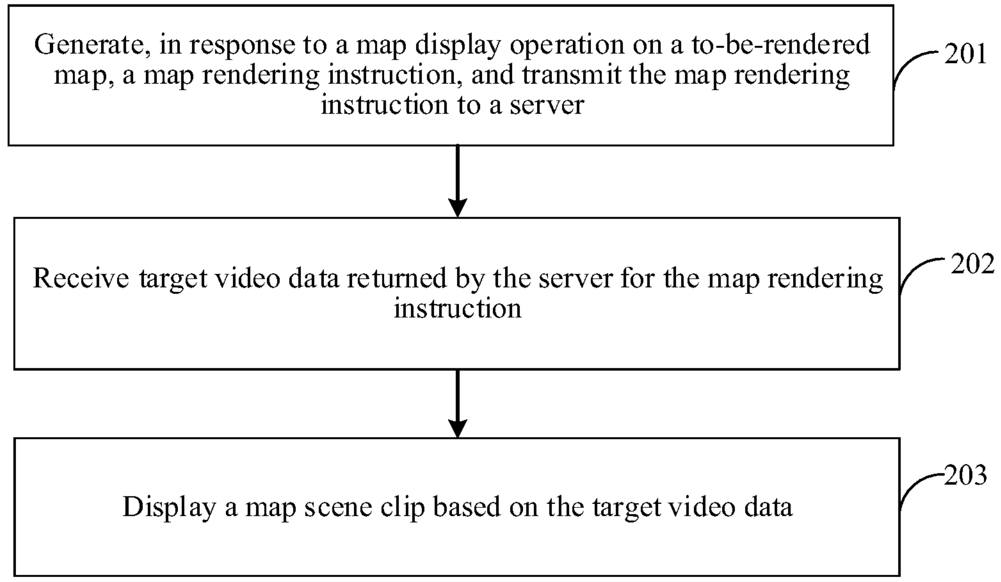
FIG. 4 is a schematic flowchart of a map scene rendering method according to some embodiments.

FIG. 4 is a schematic flowchart of a map scene rendering method according to some embodiments. The process includes operations 201 to 203. Each operation is described separately below.

Operation 201: Generate, in response to a map display operation on a to-be-rendered map, a map rendering instruction, and transmit the map rendering instruction to a server.

The map display operation may be an operation triggered by a user on a terminal to request for displaying a corresponding map scene, for example, a click/tap, a move, and another operation triggered on the terminal. The map rendering instruction includes path start and end information in the to-be-rendered map. In some embodiments, the server may be a cloud server deployed in a cloud.

There may be a plurality of methods to transmit the map rendering instruction to the server. For example, continue to refer to FIG. 3B. The map display operation triggers instruction distribution. The map rendering instruction can be transmitted to the cloud server via a real-time audio and video communication technology (web real-time communications software development kit (WebRTC SDK)).

Operation 202: Receive target video data returned by the server for the map rendering instruction.

The target video data is data obtained by determining at least one target instance node from a rendering instance node queue based on the path start and end information in the map rendering instruction and rendering, based on all the target instance nodes, resource tiles corresponding to the map scene by the server.

The target video data may be rendered video data rendered by the server on the cloud, or may be data obtained by rendering on the cloud and performing rate control, packet header labeling, resolution adaptation, and other video processing by the server. Specifically, this may be set according to actual conditions, and is not limited herein.

There may be a plurality of methods to receive the target video data returned by the server for the map rendering instruction. For example, a plurality of pixel streams (which are referred to as target video data) returned by the server for the map rendering instruction may be received by the WebRTC SDK. In addition, during a map scene rendering process, a plurality of rendering instance nodes may transmit videos concurrently, and concurrent transmission may occupy input/output (IO) resources on the terminal. Therefore, to reduce the resource occupation of the concurrent transmission and improve resource utilization, a multiplexing policy (refer to FIG. 3*b*) of multiplexing a transmission I/O channel can be used on the terminal to receive the target video data returned by the server. The multiplexing technology represents a process and a technology of transmitting a plurality of signals or data streams on one channel. Because the multiplexing can integrate a plurality of low-speed (where a transmission speed is lower than a speed threshold) channels into a high-speed (where a transmission speed is higher than the speed threshold) channel for transmission, the high-speed channel can be effectively utilized, thereby reducing resource management consumption for a plurality of lines.

Operation 203: Display a map scene clip based on the target video data.

There may be a plurality of methods to display the map scene clip based on the target video data. For example, packet header label information can be extracted from the target video data, and a topological sorting parameter of the target video data can be obtained by parsing the packet header label information. The target video data is aggregated based on the topological sorting parameter, to obtain aggregated video data. The map scene clip in the map scene is displayed based on the aggregated video data.

The packet header label information may be label information generated by performing packet header labeling on a key frame corresponding to the target video data. The packet header label information may include information such as a topological sorting linked list corresponding to the target video data, a current rendering instance node, camera parameters of the first and last frames corresponding to a current rendering instance, and a pixel stream size, a pixel length and width, and pixel stream content corresponding to the target video data. For example, continue to refer to the packet header structure information shown in Table 1. The topological sorting parameter may be distribution information of the target video data in the map scene determined based on a node relationship graph corresponding to the map scene. For example, the topological sorting parameter may include information such as scenarios and rendering instance nodes corresponding to the target video data, and distribution of the rendering instance nodes corresponding to the target video data in the node relationship graph. The aggregated video data may be video data obtained by aggregating the target video data based on the topological sorting parameter.

There may be a plurality of methods to aggregate the target video data based on the topological sorting parameter. For example, a connection relationship between each piece of video data and another piece of video data in the target video data can be determined based on the topological sorting parameter. A target node relationship graph corresponding to the target video data is constructed based on the connection relationship. At least one adjacent video data pair in the target video data is identified based on the target node relationship graph. Adjacent video frames between the adjacent video data pair are spliced. When splicing on all adjacent video data pairs is completed, the aggregation on the target video data is also completed.

The target node relationship graph may be a directed acyclic graph constructed based on the target video data. An association sequence of the target video data corresponding to the rendering instance can be reconstructed based on the target node relationship graph, to facilitate subsequent splicing, arrangement, and playback of the target video data. The adjacent video data pair may be video data having an adjacent relationship determined in the target video data based on distribution of each piece of target video data in the map scene described in the target node relationship graph, that is, video data corresponding to adjacent nodes having a connection relationship in the target node relationship graph. The target video data includes a plurality of video frames, and the adjacent video data pair includes adjacent video frames. The adjacent video frames may be video frames having an adjacent relationship between the adjacent video data pair, for example, may be the last frame of target video data in the front of the adjacent video data pair and the first frame of target video data in the back of the adjacent video data pair (as shown in FIG. 3*b*, which is referred to as splicing on multi-channel video first and last frames). In some embodiments, the first and the last frames may be a plurality of video frames.

There may be a plurality of methods to splice the adjacent video frames between the adjacent video data pair. For example, a multi-channel video splicing technology may be used to connect, transition, and fuse the adjacent video frames of the adjacent video data pair such as the first and last key frames. The multi-channel video splicing technology is a technology that obtains model transformation parameters, color brightness gamma correction coefficients, optimal suture lines, and corresponding weighted fusion matrices between multi-channel video images in the current scene to make final fused panoramic video images transition smoothly in overlapping areas, and a suture line transition region between two adjacent images be smoother in the real-time processing stage. In some embodiments, an intersection of a current moment apparatus perspective and an after or before user perspective can be obtained as an actual range of video data splicing and aggregation. The apparatus perspective may be a camera perspective set for the rendering instance at a current moment, and the user perspective after or before the current moment may be a camera perspective set by the user via the terminal within a specific time range. Video data within the range of video data splicing and aggregation can be determined based on the two perspectives. Therefore, the terminal can extract the video data within the range of video data splicing and aggregation, and label corresponding numbers, so that the video splicing technology can be used to aggregate the video data having the labeled numbers. After the target video data is aggregated, the corresponding map scene clip may be displayed based on aggregated video data to implement map display (refer to FIG. 3*b*), so that the user can see a video scene of rendering instances connected in series in the cloud rendering map on the terminal.

It can be learned from the above that, in some embodiments, a map rendering instruction including path start and end information corresponding to a map scene is generated based on a map display operation. The map rendering instruction is transmitted to a server. Then, target video data returned by the server for the map rendering instruction is received. The map scene corresponding to the path start and end information is displayed. This avoids repeated rendering on a map scene resource and improves rendering efficiency of the map scene, thereby improving resource utilization.

Figure 5:
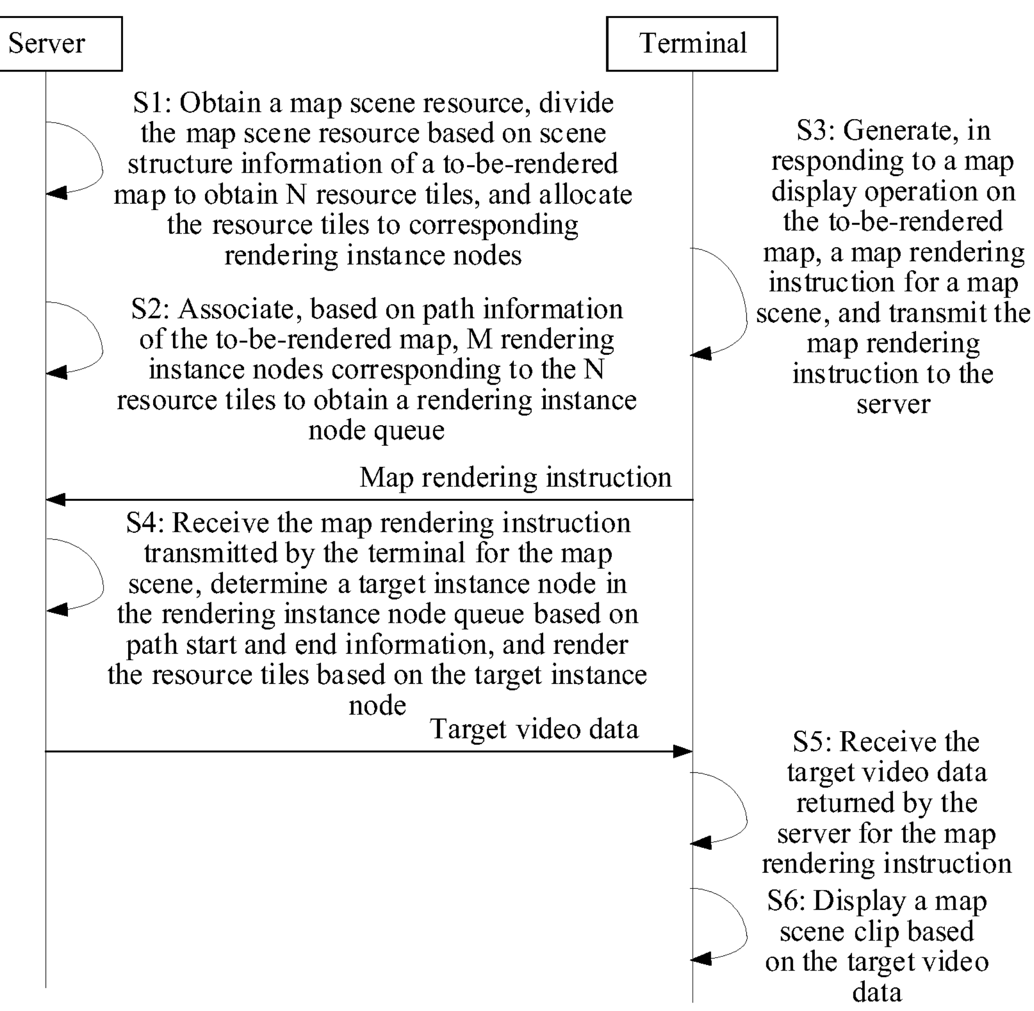
FIG. 5 is a schematic sequence diagram of a map scene rendering method according to some embodiments.

FIG. 5 is a schematic sequence diagram of a map scene rendering method according to some embodiments. The method process may include operations S1 to S6. Each operation is described separately below.

Operation S1: A server obtains a map scene resource, divides the map scene resource based on scene structure information of a to-be-rendered map to obtain N resource tiles, and allocates the resource tiles to corresponding rendering instance nodes.

An implementation process of operation S1 is similar to that of operation 101 and operation 102, and is not described again herein.

Operation S2: The server associates, based on path information of the to-be-rendered map, M rendering instance nodes corresponding to the N resource tiles to obtain a rendering instance node queue.

An implementation process of operation S2 is similar to that of operation 103, and is not described again herein.

Operation S3: A terminal generates, in responding to a map display operation on the to-be-rendered map, a map rendering instruction for a map scene, and transmits the map rendering instruction to the server.

An implementation process of operation S3 is similar to that of operation 201, and is not described again herein.

Operation S4: The server receives the map rendering instruction transmitted by the terminal for the map scene, determines a target instance node in the rendering instance node queue based on path start and end information, and renders the resource tiles based on the target instance node.

An implementation process of operation S4 is similar to that of operation 105, and is not described again herein.

Operation S5: The terminal receives target video data returned by the server for the map rendering instruction.

An implementation process of operation S5 is similar to that of operation 202, and is not described again herein.

Operation S6: The terminal displays a map scene clip based on the target video data.

An implementation process of operation S6 is similar to that of operation 203, and is not described again herein.

Some embodiments further provide a video rendering method, applied to a server.

Figure 6:
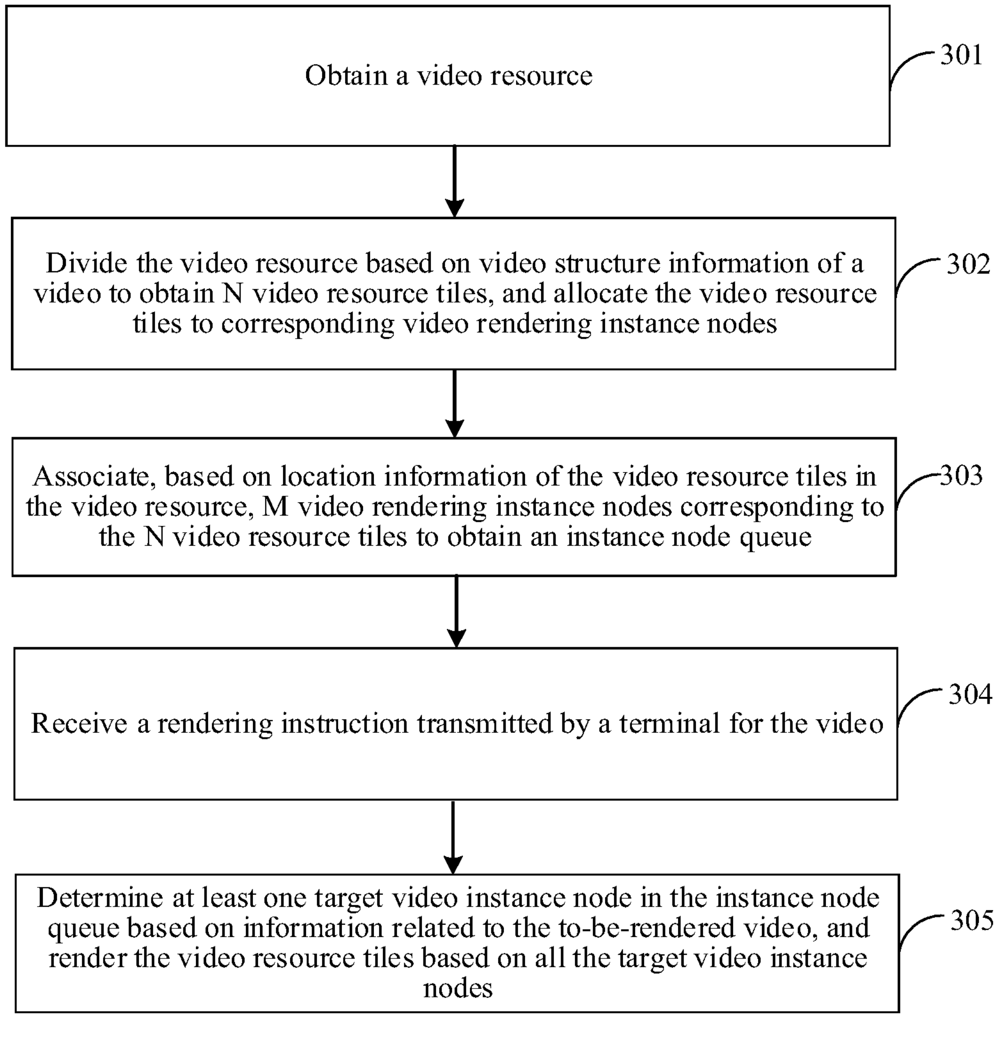
FIG. 6 is a schematic flowchart of a video rendering method according to some embodiments.

FIG. 6 is a schematic flowchart of a video rendering method according to some embodiments. An execution subject of the video rendering method is a server, and the video rendering method includes operations 301 to 305. Each operation is described separately below.

Operation 301: Obtain a video resource.

The video resource may be used for constructing a video, or may be a resource corresponding to a video, for example, may be a to-be-rendered video or materials used for constructing a to-be-rendered video.

Operation 302: Divide the video resource based on video structure information of the video to obtain N video resource tiles, and allocate the video resource tiles to corresponding video rendering instance nodes.

The video structure information may be information describing structure distribution in the video. For example, the video structure information may describe episode distribution in the video, for example, describe a location of episode division in the video, and also describe plot distribution in the video. For example, the video can be divided based on plot content in the video, so that clip distribution of the video resource and the like can be described based on the plot content of the video. The video resource tiles may be tiles obtained by dividing the video resource based on the video structure information of the video. The video rendering instance node may be an instance node for rendering the video resource tiles. The instance node may be an instance deployed in a cloud.

Operation 303: Associate, based on location information of the video resource tiles in the video resource, M video rendering instance nodes corresponding to the N video resource tiles to obtain an instance node queue.

The location information may be a location of a video resource tile in the video resource, that is, a location of a video clip corresponding to the video resource tile in the video. The instance node queue may be, after the video rendering instance nodes are sorted based on the location information of the video resource tiles in the video resource, a queue constructed based on the sorted video rendering instance nodes.

Operation 304: Receive a rendering instruction transmitted by a terminal for the video.

The rendering instruction may be an instruction for rendering the video. The rendering instruction may include information related to the to-be-rendered video, and is used for indicating content on a server side that needs to be rendered, for example, indicating a video resource that currently needs to be rendered and to-be-rendered content on the server side. For example, the information related to the video may include the video resource corresponding to the to-be-rendered video, or may include information such as an index of the video. The server side may find the video resource of the to-be-rendered video based on the index.

Operation 305: Determine at least one target video instance node in the instance node queue based on the information related to the to-be-rendered video, and render the video resource tiles based on all the target video instance nodes.

The target video instance node may be a video rendering instance node corresponding to the to-be-rendered video resource tiles determined based on the rendering instruction.

It can be learned from the above that, in some embodiments, a video resource is divided based on video structure information of a video, and an instance node queue corresponding to video resource tiles is constructed based on location information of the video resource tiles in the video resource. Therefore, when a rendering instruction is received, based on information related to the to-be-rendered video carried in the rendering instruction, a target video instance node corresponding to the video is found in the instance node queue, and the video resource tiles corresponding to the information related to the to-be-rendered video are rendered based on all the target video instance nodes. This avoids repeated rendering on the video resource and reduces a cloud resource occupation ratio. In addition, the tiling-based resource rendering method improves rendering efficiency of the video, thereby improving resource utilization.

Some embodiments further provide a rendered video data playing method, applied to a terminal.

Figure 7:
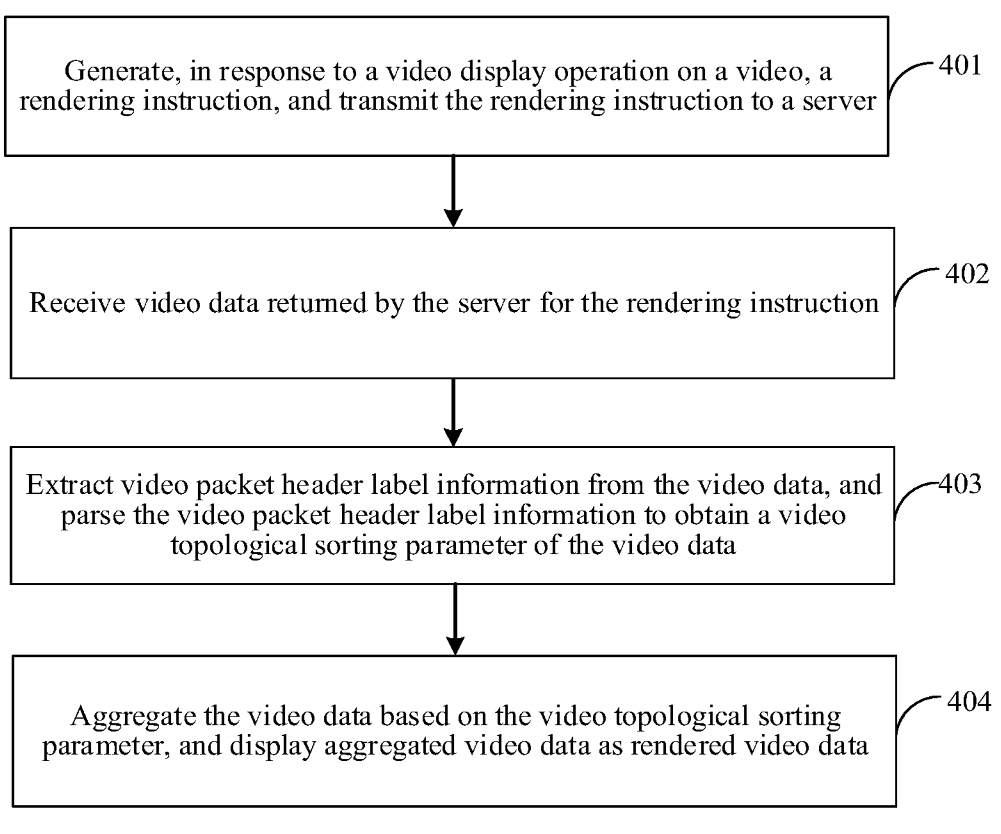
FIG. 7 is a schematic flowchart of a rendered video data playing method according to some embodiments.

FIG. 7 is a schematic flowchart of a rendered video data playing method according to some embodiments. An execution subject of the rendered video data playing method is a terminal, and the rendered video data playing method includes operations 401 to 404. Each operation is described separately below.

Operation 401: Generate, in response to a video display operation on a video, a rendering instruction, and transmit the rendering instruction to a server.

The video display operation may be an operation triggered by a user on a terminal to request for displaying a corresponding video on the terminal, for example, a click/tap, a move, and another operation triggered on the terminal. The rendering instruction may include information related to a to-be-rendered video. In some embodiments, the server may be a cloud server deployed in a cloud.

Operation 402: Receive video data returned by the server for the rendering instruction.

The video data may be data obtained by determining a target video instance node in an instance node queue based on the information related to the to-be-rendered video included in the rendering instruction and rendering, based on the target video instance node, video resource tiles corresponding to the information related to the to-be-rendered video by the server.

Operation 403: Extract video packet header label information from the video data, and parse the video packet header label information to obtain a video topological sorting parameter of the video data.

The video packet header label information may be label information generated by performing packet header labeling on a key frame corresponding to the video data. The packet header label information may include information such as a topological sorting linked list corresponding to the video data, a current video rendering instance node, camera parameters of the first and last frames corresponding to the current video rendering instance node, and a pixel stream size, a pixel length and width, and pixel stream content corresponding to the video data. For example, continue to refer to the packet header structure information shown in Table 1. The topological sorting linked list may be a linked list that represents distribution of the video data in the video determined based on the instance node queue corresponding to the video data. The topological sorting parameter may be distribution information of the video data in the video determined based on the instance node queue corresponding to the video, and may be determined based on the topological sorting linked list corresponding to the video data, the current video rendering instance node, and other information. The topological sorting parameter may include information such as video rendering instance nodes corresponding to the video data and distribution of the video rendering instance nodes corresponding to the video data in the instance node queue.

Operation 404: Aggregate the video data based on the video topological sorting parameter, and display aggregated video data as rendered video data.

The aggregated video data may be video data obtained by aggregating the video data based on the topological sorting parameter. The rendered video data may be video data obtained based on the rendering instruction.

It can be learned from the above that, in some embodiments, a rendering instruction including information related to a to-be-rendered video is generated based on a video display operation. The rendering instruction is transmitted to a server. Then, video data returned by the server for the rendering instruction is received. The video corresponding to the information related to the to-be-rendered video is displayed. This avoids repeated rendering on a video resource and improves rendering efficiency of the video, thereby improving resource utilization.

Some embodiments further provide a first map scene rendering apparatus. The first map scene rendering apparatus may be integrated in an electronic device, and the electronic device may be a server.

Figure 8:
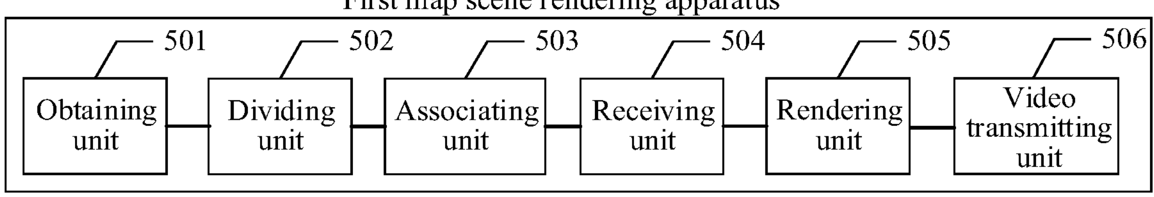
FIG. 8 is a schematic diagram of a structure of a first map scene rendering apparatus according to some embodiments.

FIG. 8 is a schematic diagram of a structure of a first map scene rendering apparatus according to some embodiments. The first map scene rendering apparatus may include an obtaining unit 501, a dividing unit 502, an associating unit 503, a receiving unit 504, a rendering unit 505, and a video transmitting unit 506. Each unit is described separately below.

The receiving unit 504 is configured to receive a map rendering instruction transmitted by a terminal for a to-be-rendered map, the map rendering instruction including path start and end information in the to-be-rendered map.

The rendering unit 505 is configured to determine at least one target instance node corresponding to the path start and end information from a rendering instance node queue, the rendering instance node queue being obtained by associating M rendering instance nodes based on path information of the to-be-rendered map, the M rendering instance nodes being used for rendering N resource tiles, the N resource tiles being obtained by dividing a map scene resource based on scene structure information of the to-be-rendered map, the map scene resource being used for rendering a map scene of the to-be-rendered map, M≤N, and M and N being positive integers, and render the resource tiles based on all the target instance nodes to obtain target video data.

The video transmitting unit 506 is configured to transmit the target video data to the terminal.

In some embodiments, the obtaining unit 501 is configured to obtain the map scene resource. The dividing unit 502 is configured to divide the map scene resource based on the scene structure information to obtain the N resource tiles, and allocate the resource tiles to the corresponding rendering instance nodes. The associating unit 503 is configured to associate, based on the path information, the M rendering instance nodes corresponding to the N resource tiles to obtain the rendering instance node queue.

In some embodiments, the dividing unit 502 is further configured to divide the map scene resource in a scenario dimension based on scenario distribution information to obtain scenario resource tiles corresponding to each scenario of the to-be-rendered map, identify adjacent scenarios among all scenarios of the to-be-rendered map based on the scenario distribution information, and divide the map scene resource to obtain a cross-scenario resource tile of the adjacent scenarios, and determine the N resource tiles based on the scenario resource tiles and the cross-scenario resource tile.

In some embodiments, the dividing unit 502 is further configured to calculate connection distances of candidate scenario connection paths between the adjacent scenarios based on the scenario resource tiles corresponding to each scenario, determine a candidate scenario connection path corresponding to the shortest connection distance as a target connection path, and determine a resource tile that is obtained by dividing the map scene resource and that is corresponding to the target connection path as the cross-scenario resource tile of the adjacent scenarios.

In some embodiments, the dividing unit 502 is further configured to divide the map scene resource into scenarios based on the scenario distribution information, to obtain a scenario resource clip corresponding to each scenario, perform point of interest identification on the scenario resource clip to obtain point of interest distribution corresponding to each scenario, and divide the scenario resource clip based on the point of interest distribution, to obtain the scenario resource tiles corresponding to each scenario.

In some embodiments, the associating unit 503 is further configured to identify connection path distribution of the N resource tiles based on the path information, determine a node connection sequence between the M rendering instance nodes based on the connection path distribution, and construct the rendering instance node queue according to the node connection sequence.

In some embodiments, the associating unit 503 is further configured to construct, based on the connection path distribution, a node relationship graph corresponding to the M rendering instance nodes, the node relationship graph being a directed acyclic graph constructed based on the M rendering instance nodes, and identify the node connection sequence between the M rendering instance nodes based on the node relationship graph.

In some embodiments, the rendering unit 505 is configured to extract a start location and an end location corresponding to the to-be-rendered map from the path start and end information, obtain a target location interval between the start location and the end location, and identify at least one target resource tile located in the target location interval from the plurality of resource tiles, and select the at least one target instance node corresponding to the at least one target resource tile from the rendering instance node queue.

In some embodiments, the rendering unit 505 is configured to render the resource tiles based on all the target instance nodes to obtain rendered video data, obtain at least one piece of rendered video data rendered based on the at least one target instance node from the rendered video data rendered based on all the target instance nodes, obtain a topological sorting parameter of the at least one piece of rendered video data, and label the at least one piece of rendered video data based on the topological sorting parameter to obtain the target video data.

Some embodiments further provide a second map scene rendering apparatus. The second map scene rendering apparatus may be integrated in a terminal.

Figure 9:
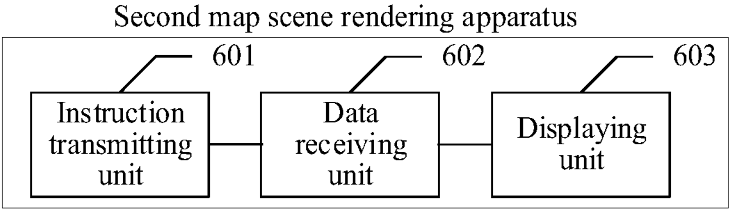
FIG. 9 is a schematic diagram of a structure of a second map scene rendering apparatus according to some embodiments.

FIG. 9 is a schematic diagram of a structure of a second map scene rendering apparatus according to some embodiments. The second map scene rendering apparatus may include an instruction transmitting unit 601, a data receiving unit 602, and a displaying unit 603. Each unit is described separately below.

The instruction transmitting unit 601 is configured to generate, in response to a map display operation on a to-be-rendered map scene, a map rendering instruction for the map scene, and transmit the map rendering instruction to a server, the map rendering instruction including path start and end information corresponding to the to-be-rendered map scene.

The data receiving unit 602 is configured to receive target video data returned by the server for the map rendering instruction, the target video data being data obtained by the server by determining at least one target instance node from a rendering instance node queue based on the path start and end information included in the map rendering instruction, and rendering, based on all the target instance nodes, resource tiles corresponding to the map scene, the rendering instance node queue being obtained by associating M rendering instance nodes based on path information of the to-be-rendered map, the M rendering instance nodes being used for rendering N resource tiles, the N resource tiles being obtained by dividing a map scene resource based on scene structure information of the to-be-rendered map, the map scene resource being used for rendering the map scene of the to-be-rendered map, MEN, and M and N being positive integers.

The displaying unit 603 is configured to display a map scene clip based on the target video data.

In some embodiments, the displaying unit 603 is further configured to extract packet header label information from the target video data, parse the packet header label information to obtain a topological sorting parameter of at least one piece of rendered video data in the target video data, the rendered video data being a result obtained by rendering the resource tiles based on all the target instance nodes, and aggregate the at least one piece of rendered video data based on the topological sorting parameter, to obtain aggregated video data, and display the map scene clip based on the aggregated video data.

In some embodiments, the displaying unit 603 is further configured to construct, based on the topological sorting parameter, a target node relationship graph corresponding to the target video data, the target node relationship graph being a directed acyclic graph constructed based on the target video data, identify at least one adjacent video data pair in the target video data based on the target node relationship graph, the adjacent video data pair including adjacent video frames, and splice the adjacent video frames between the adjacent video data pair, and aggregate the target video data based on the spliced adjacent video data pair.

The foregoing units may be implemented as independent entities, or may be combined arbitrarily, or may be implemented as the same entity or a plurality of entities. This is not limited herein.

Some embodiments further provide a first video rendering apparatus. The first video rendering apparatus may be integrated in a server.

Figure 10:
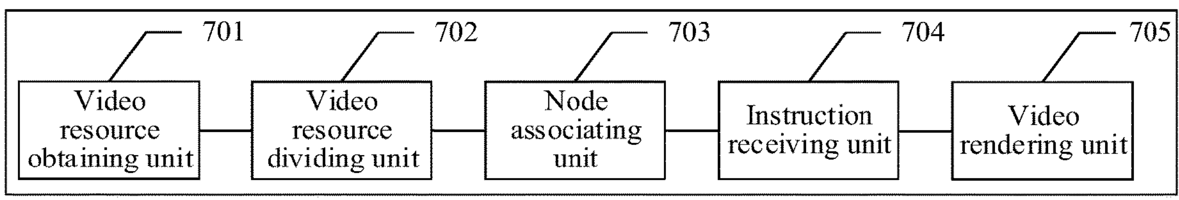
FIG. 10 is a schematic diagram of a structure of a first video rendering apparatus according to some embodiments.

FIG. 10 is a schematic diagram of a structure of a first video rendering apparatus according to some embodiments. The first video rendering apparatus may include a video resource obtaining unit 701, a video resource dividing unit 702, a node associating unit 703, an instruction receiving unit 704, and a video rendering unit 705. Each unit is described separately below.

The video resource obtaining unit 701 is configured to obtain a video resource, the video resource being configured to construct a video.

The video resource dividing unit 702 is configured to divide the video resource based on video structure information of the video to obtain N video resource tiles, and allocate the video resource tiles to corresponding video rendering instance nodes.

The node associating unit 703 is configured to associate, based on location information of the video resource tiles in the video resource, the M video rendering instance nodes corresponding to the N video resource tiles to obtain an instance node queue.

The instruction receiving unit 704 is configured to receive a rendering instruction transmitted by a terminal on the video, the rendering instruction including information related to the to-be-rendered video.

The video rendering unit 705 is configured to determine a target video instance node in the instance node queue based on the information related to the to-be-rendered video, and render the video resource tiles based on the target video instance nodes to obtain video data, and transmit the video data to the terminal.

Some embodiments further provide a second video rendering apparatus. The second video rendering apparatus may be specifically integrated in a terminal.

Figure 11:
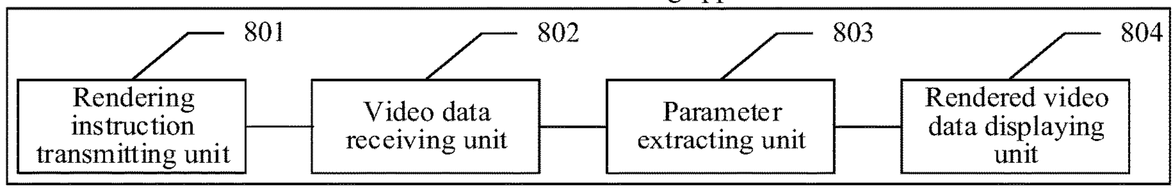
FIG. 11 is a schematic diagram of a structure of a second video rendering apparatus according to some embodiments.

FIG. 11 is a schematic diagram of a structure of a second video rendering apparatus according to some embodiments. The second video rendering apparatus may include a rendering instruction transmitting unit 801, a video data receiving unit 802, a parameter extracting unit 803, and a rendered video data displaying unit 804. Each unit is described separately below.

The rendering instruction transmitting unit 801 is configured to generate, in response to a video display operation on a video, a rendering instruction for the video, and transmit the rendering instruction to a server, the rendering instruction including information related to the to-be-rendered video.

The video data receiving unit 802 is configured to receive video data returned by the server for the rendering instruction, the video data being obtained by determining at least one target video instance node from an instance node queue based on the information related to the to-be-rendered video and rendering corresponding video resource tiles based on all the target video instance nodes by the server, the instance node queue being obtained by associating M video rendering instance nodes based on location information of video resource tiles in a video resource, the M video rendering instance nodes being used for rendering N video resource tiles, the N video resource tiles being obtained by dividing the video resource based on video structure information of the video, the video resource being used for constructing the video, M≤N, and M and N being positive integers.

The parameter extracting unit 803 is configured to extract video packet header label information from the video data, and parse the video packet header label information to obtain a video topological sorting parameter of the video data.

The rendered video data displaying unit 804 is configured to aggregate the video data based on the video topological sorting parameter, and display aggregated video data as rendered video data.

The foregoing units may be implemented as independent entities, or may be combined arbitrarily, or may be implemented as the same entity or a plurality of entities. Each unit is described separately below.

A person skilled in the art would understand that these "units" could be implemented by hardware logic, a processor or processors executing computer software code, or a combination of both. The "units" may also be implemented in software stored in a memory of a computer or a non-transitory computer-readable medium, where the instructions of each unit are executable by a processor to thereby cause the processor to perform the respective operations of the corresponding unit.

Figure 12:
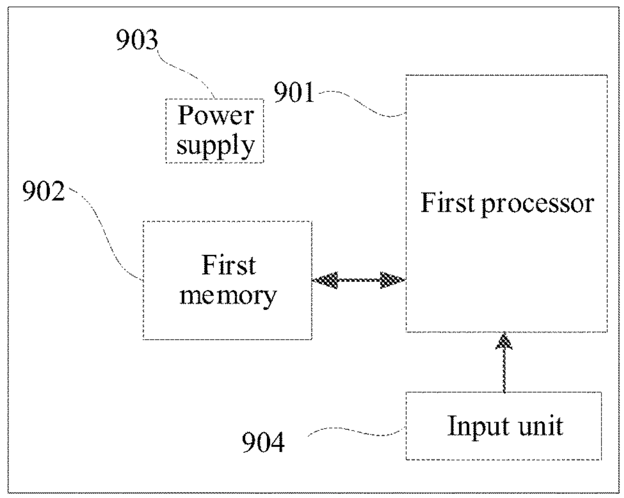
FIG. 12 is a schematic diagram of a structure of an electronic device according to some embodiments.

Some embodiments further provide an electronic device. FIG. 12 is a schematic diagram of a structure of an electronic device in some embodiments. The electronic device may be a server.

The electronic device may include components such as a first processor 901 of one or more processing cores, a first memory 902 of one or more computer-readable storage media, a power supply 903, and an input unit 904. A person skilled in the art may understand that the structure of the electronic device shown in FIG. 12 does not constitute a limitation to the electronic device, and the electronic device may include more components or fewer components than those shown in the figure, or some components may be combined, or a different component deployment may be used.

The first processor 901 is a control center of the electronic device, and is connected to various parts of the entire electronic device by using interfaces and lines, and performs various functions of the electronic device and processes data by running or executing software programs and/or modules stored in the first memory 902 and calling data stored in the first memory 902. In one embodiment, the first processor 901 may include one or more processing cores. In some embodiments, the first processor 901 may integrate an application processor and a modem processor. The application processor mainly processes an operating system, a user interface, an application program, and the like. The modem processor mainly processes wireless communication. It is to be understood that, the foregoing modem processor may either not be integrated into the first processor 901.

The first memory 902 may be configured to store software programs and modules. The first processor 901 executes various functional applications and map scene rendering by running the software programs and modules stored in the first memory 902. The first memory 902 may mainly include a program storage area and a data storage area. The program storage area may store an operating system, an application program required by at least one function (for example, a sound playing function and an image playing function), and the like. The data storage area may store data created based on use of the electronic device. In addition, the first memory 902 may include a high speed random access memory, and may also include a non-volatile memory, such as at least one magnetic disk storage device, a flash memory, or another volatile solid-state storage device. Correspondingly, the first memory 902 may further include a memory controller, to provide access of the first processor 901 to the first memory 902.

The electronic device further includes the power supply 903 supplying power to the components. Preferably, the power supply 903 may be logically connected to the first processor 901 by using a power management system, thereby implementing functions such as charging, discharging, and power consumption management by using the power management system. The power supply 903 may further include one or more of a direct current or alternating current power supply, a re-charging system, a power failure detection circuit, a power supply converter or inverter, a power supply state indicator, and any other components.

The electronic device may further include the input unit 904. The input unit 904 may be configured to receive entered numeric or character information and generate keyboard, mouse, joystick, optical, or trackball signal input related to user settings and function control.

Although not shown, the electronic device may further include a display unit and the like. This is not described herein again. Specifically, in the embodiment, the first processor 901 in the electronic device is to load executable files corresponding to processes of one or more application programs into the first memory 902 according to the following instructions. In addition, the first processor 901 runs the application programs stored in the first memory 902, to implement the map scene rendering method provided in some embodiments and applied to the server.

The electronic device provided in some embodiments and the map scene rendering method applied to the server in some embodiments belong to the same concept. This is not described herein again.

Figure 13:
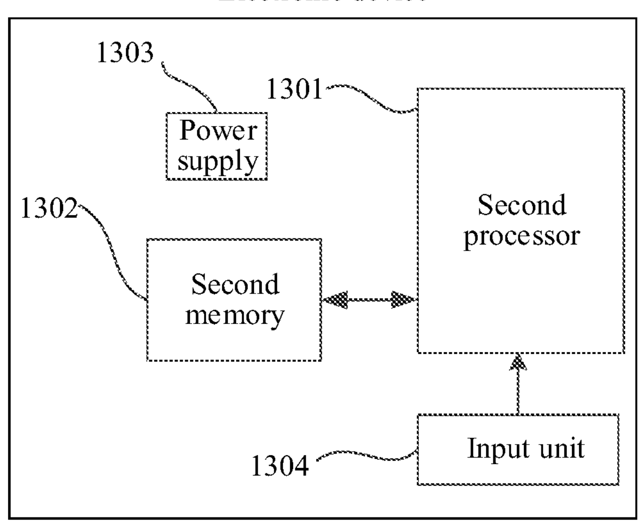
FIG. 13 is a schematic diagram of a structure of an electronic device according to some embodiments.

Some embodiments further provide an electronic device. FIG. 13 is a schematic diagram of a structure of an electronic device in some embodiments. The electronic device may be a terminal.

The electronic device may include components such as a second processor 1301 of one or more processing cores, a second memory 1302 of one or more computer-readable storage media, a power supply 1303, and an input unit 1304. A person skilled in the art may understand that the structure of the electronic device shown in FIG. 12 does not constitute a limitation to the electronic device, and the electronic device may include more components or fewer components than those shown in the figure, or some components may be combined, or a different component deployment may be used.

A person of ordinary skill in the art may understand that, all or some operations of the methods in the foregoing embodiments may be implemented by using instructions, or implemented through instructions controlling related hardware. The instructions may be stored in a computer-readable storage medium and loaded and executed by a first processor or a second processor.

Therefore, some embodiments provide a computer-readable storage medium, having computer-executable instructions or a computer program stored thereon, the computer-executable instructions or the computer program being loadable by a first processor to perform the method applied to a server, or the computer-executable instructions or the computer program being loadable by a second processor to perform the method applied to a terminal.

The computer-readable storage medium may include: a read-only memory (ROM), a random access memory (RAM), a magnetic disk, an optical disc, and the like.

Since the instructions stored on the computer-readable storage medium may perform the operations of any map scene rendering method provided in some embodiments, the instructions can implement advantageous effects that may be implemented by any map scene rendering method provided by some embodiments. This is not described herein again.

Some embodiments provide a computer program product, including computer-executable instructions or a computer program, the computer-executable instructions or the computer program, when executed by a first processor, implementing the method applied to a server, or the computer-executable instructions or the computer program, when executed by a second processor, implementing the method applied to a terminal.

It is to be understood that, in some embodiments, data related to operations and the like is involved. When some embodiments are applied to specific products or technologies, user permission or consent needs to be obtained, and collection, use, and processing of related data need to comply with relevant laws, regulations and standards of relevant countries and regions.

What is claimed is:

1. A map scene rendering method, performed by an electronic device, comprising:

- receiving a map rendering instruction transmitted by a terminal for a to-be-rendered map, the map rendering instruction comprising path start and end information in the to-be-rendered map;
- extracting a start location and an end location corresponding to the to-be-rendered map from the path start and end information;
- obtaining a target location interval between the start location and the end location, and
- determining at least one target instance node among M rendering instance nodes from a rendering instance node queue based on the target location interval, the rendering instance node queue being obtained by associating the M rendering instance nodes based on path information of the to-be-rendered map, each rendering instance node of the M instance rendering nodes is configured to render at least one corresponding resource tile of N resource tiles, the N resource tiles being obtained by dividing a map scene resource based on scene structure information of the to-be-rendered map, the map scene resource being for rendering a map scene of the to-be-rendered map, M and N being positive integers and M being less than or equal to N;
- rendering at least one target resource tile of the N resource tiles corresponding to the at least one target instance node to obtain target video data; and
- transmitting the target video data to the terminal.

2. The map scene rendering method according to claim 1, wherein before the determining the at least one target instance node, the map scene rendering method further comprises:

- obtaining the map scene resource;
- dividing the map scene resource based on the scene structure information to obtain the N resource tiles, and allocating each of the N resource tiles to a corresponding rendering instance node of the M rendering instance nodes; and
- associating, based on the path information, the M rendering instance nodes corresponding to the N resource tiles to obtain the rendering instance node queue.

3. The map scene rendering method according to claim 2, wherein the scene structure information comprises scenario distribution information, and

- wherein the dividing the map scene resource comprises:
- dividing the map scene resource in a scenario dimension based on the scenario distribution information to obtain scenario resource tiles corresponding to each scenario of the to-be-rendered map;
- identifying adjacent scenarios among all scenarios of the to-be-rendered map based on the scenario distribution information, and dividing the map scene resource to obtain a cross-scenario resource tile of the adjacent scenarios; and
- determining the N resource tiles based on the scenario resource tiles and the cross-scenario resource tile.

4. The map scene rendering method according to claim 3, wherein the dividing the map scene resource to obtain the cross-scenario resource tile of the adjacent scenarios comprises:

- calculating connection distances of candidate scenario connection paths between the adjacent scenarios based on the scenario resource tiles corresponding to each scenario;
- determining a candidate scenario connection path among the candidate scenario connection paths as a target connection path, the candidate scenario connection path corresponding to a shortest connection distance; and
- determining a resource tile among the N resource tiles that corresponds to the target connection path as the cross-scenario resource tile of the adjacent scenarios.

5. The map scene rendering method according to claim 3, wherein the dividing the map scene resource in the scenario dimension comprises:

- dividing the map scene resource into the scenarios based on the scenario distribution information, to obtain a scenario resource clip for each scenario;
- performing point of interest identification on the scenario resource clip for each scenario to obtain point of interest distribution corresponding to each scenario; and
- dividing the scenario resource clip for each scenario based on the point of interest distribution, to obtain the scenario resource tiles corresponding to each scenario.

6. The map scene rendering method according to claim 2, wherein the associating the M rendering instance nodes comprises:

- identifying a connection path distribution of the N resource tiles based on the path information;
- determining a node connection sequence between the M rendering instance nodes based on the connection path distribution; and
- constructing the rendering instance node queue according to the node connection sequence.

7. The map scene rendering method according to claim 6, wherein the determining the node connection sequence between the M rendering instance nodes comprises:

- constructing, based on the connection path distribution, a node relationship graph corresponding to the M rendering instance nodes, the node relationship graph being a directed acyclic graph constructed based on the M rendering instance nodes; and
- identifying the node connection sequence between the M rendering instance nodes based on the node relationship graph.

8. The map scene rendering method according to claim 1, wherein the determining the at least one target instance node comprises:

selecting the at least one target instance node corresponding to the at least one target resource tile from the rendering instance node queue.

9. The map scene rendering method according to claim 1, wherein the rendering the at least one target resource tile comprises:

rendering the at least one target resource tile based on the at least one target instance node to obtain rendered video data;

obtaining at least one piece of rendered video data from the rendered video data;

obtaining a topological sorting parameter of the at least one piece of rendered video data; and labeling the at least one piece of rendered video data based on the topological sorting parameter to obtain the target video data.

10. A map scene rendering apparatus, comprising:

at least one memory configured to store program code; and at least one processor configured to read the program code and operate as instructed by the program code, the program code comprising:

receiving code configured to cause at least one of the at least one processor to receive a map rendering instruction transmitted by a terminal for a to-be-rendered map, the map rendering instruction comprising path start and end information in the to-be-rendered map;

rendering code configured to cause at least one of the at least one processor to:

extract a start location and an end location corresponding to the to-be-rendered map from the path start and end information, obtain a target location interval between the start location and the end location, determine at least one target instance node among M rendering instance nodes from a rendering instance node queue based on the target location interval, the rendering instance node queue being obtained by associating the M rendering instance nodes based on path information of the to-be-rendered map, each rendering instance node of the M rendering nodes is configured to render a corresponding resource tile of N resource tiles, the N resource tiles being obtained by dividing a map scene resource based on scene structure information of the to-be-rendered map, the map scene resource being for rendering a map scene of the to-be-rendered map, M and N being positive integers and M being less than or equal to N, and render at least one target resource tile of the N resource tiles corresponding to the at least one target instance node to obtain target video data; and video transmitting code configured to transmit the target video data to the terminal.

11. The map scene rendering apparatus according to claim 10, wherein the program code further comprises obtaining code configured to cause at least one of the at least one processor to obtain the map scene resource;

wherein the dividing code is further configured to cause at least one of the at least one processor to divide the map scene resource based on the scene structure information to obtain the N resource tiles, and allocate each of the N resource tiles to a corresponding rendering instance node of the M rendering instance nodes; and wherein the program code further comprises associating code configured to cause at least one of the at least one processor to associate, based on the path information, the M rendering instance nodes corresponding to the N resource tiles to obtain the rendering instance node queue.

12. The map scene rendering apparatus according to claim 11, wherein the scene structure information comprises scenario distribution information, and wherein the dividing code is further configured to cause at least one of the at least one processor to:

divide the map scene resource in a scenario dimension based on the scenario distribution information to obtain scenario resource tiles corresponding to each scenario of the to-be-rendered map;

identify adjacent scenarios among all scenarios of the to-be-rendered map based on the scenario distribution information, and divide the map scene resource to obtain a cross-scenario resource tile of the adjacent scenarios; and determine the N resource tiles based on the scenario resource tiles and the cross-scenario resource tile.

13. The map scene rendering apparatus according to claim 12, wherein the dividing code is further configured to cause at least one of the at least one processor to:

calculate connection distances of candidate scenario connection paths between the adjacent scenarios based on the scenario resource tiles corresponding to each scenario;

determine a candidate scenario connection path among the candidate scenario connection paths as a target connection path, the candidate scenario connection path corresponding to a shortest connection distance; and determine a resource tile among the N resource tiles that corresponds to the target connection path as the cross-scenario resource tile of the adjacent scenarios.

14. The map scene rendering apparatus according to claim 12, wherein the dividing code is further configured to cause at least one of the at least one processor to:

divide the map scene resource into the scenarios based on the scenario distribution information, to obtain a scenario resource clip for each scenario;

perform point of interest identification on the scenario resource clip for each scenario to obtain point of interest distribution corresponding to each scenario; and divide the scenario resource clip for each scenario based on the point of interest distribution, to obtain the scenario resource tiles corresponding to each scenario.

15. The map scene rendering apparatus according to claim 11, wherein the associating code is further configured to cause at least one of the at least one processor to:

identify a connection path distribution of the N resource tiles based on the path information;

determine a node connection sequence between the M rendering instance nodes based on the connection path distribution; and construct the rendering instance node queue according to the node connection sequence.

16. The map scene rendering apparatus according to claim 15, wherein the associating code is further configured to cause at least one of the at least one processor to:

construct, based on the connection path distribution, a node relationship graph corresponding to the M rendering instance nodes, the node relationship graph being a directed acyclic graph constructed based on the M rendering instance nodes; and identify the node connection sequence between the M rendering instance nodes based on the node relationship graph.

17. The map scene rendering apparatus according to claim 10, wherein the rendering code is further configured to cause at least one of the at least one processor to:

select the at least one target instance node corresponding to the at least one target resource tile from the rendering instance node queue.

18. The map scene rendering apparatus according to claim 10, wherein the rendering code is further configured to cause at least one of the at least one processor to:

render the at least one resource tile based on the at least one target instance node to obtain rendered video data;

obtain at least one piece of rendered video data from the rendered video data;

obtain a topological sorting parameter of the at least one piece of rendered video data; and label the at least one piece of rendered video data based on the topological sorting parameter to obtain the target video data.

19. A non-transitory computer-readable storage medium storing computer code which, when executed by at least one processor, causes the at least one processor to at least:

receive a map rendering instruction transmitted by a terminal for a to-be-rendered map, the map rendering instruction comprising path start and end information in the to-be-rendered map;

extract a start location and an end location corresponding to the to-be-rendered map from the path start and end information;

obtain a target location interval between the start location and the end location;

determine at least one target instance node among M rendering instance nodes from a rendering instance node queue based on the target location interval, the rendering instance node queue being obtained by associating the M rendering instance nodes based on path information of the to-be-rendered map, each rendering instance node of the M rendering nodes is configured to render a corresponding resource tile of N resource tiles, the N resource tiles being obtained by dividing a map scene resource based on scene structure information of the to-be-rendered map, the map scene resource being for rendering a map scene of the to-be-rendered map, M and N being positive integers and M being less than or equal to N;

render at least one target resource tile of the N resource tiles corresponding to the at least one target instance node to obtain target video data; and transmit the target video data to the terminal.

20. The non-transitory computer-readable storage medium according to claim 19, wherein the computer code, when executed by the at least one processor, causes the at least one processor to at least:

obtain the map scene resource;

divide the map scene resource based on the scene structure information to obtain the N resource tiles, and allocate each of the N resource tiles to a corresponding rendering instance node of the M rendering instance nodes; and associate, based on the path information, the M rendering instance nodes corresponding to the N resource tiles to obtain the rendering instance node queue.

* * * * *